United States Patent
Bassi et al.

(10) Patent No.: US 10,396,681 B1
(45) Date of Patent: Aug. 27, 2019

(54) MULTILEVEL INVERTERS WITH INCREASED NUMBER OF OUTPUT STEPS

(71) Applicant: King Abdulaziz University, Jeddah (SA)

(72) Inventors: Hussain M. Bassi, Jeddah (SA); Muhyaddin J. Rawa, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/122,344

(22) Filed: Sep. 5, 2018

(51) Int. Cl.
*H02M 3/158* (2006.01)
*H02M 7/483* (2007.01)
*H02M 7/5387* (2007.01)

(52) U.S. Cl.
CPC ........... *H02M 7/483* (2013.01); *H02M 3/158* (2013.01); *H02M 7/53871* (2013.01)

(58) Field of Classification Search
None
See application file for complete search history.

(56) References Cited

U.S. PATENT DOCUMENTS

| | | | |
|---|---|---|---|
| 2005/0127853 A1* | 6/2005 | Su | H02M 7/487 318/108 |
| 2006/0044857 A1 | 3/2006 | Lemak | |
| 2015/0200602 A1* | 7/2015 | Narimani | H02M 5/4585 363/37 |
| 2015/0263644 A1* | 9/2015 | Fu | H02M 7/487 363/95 |
| 2016/0126862 A1 | 5/2016 | Vahedi et al. | |
| 2017/0099013 A1* | 4/2017 | Martini | H02M 7/487 |
| 2018/0248493 A1* | 8/2018 | Mihalache | H02M 1/08 |

FOREIGN PATENT DOCUMENTS

| CN | 100438303 C | 11/2008 |
|---|---|---|
| CN | 107517019 A | 12/2017 |

* cited by examiner

*Primary Examiner* — Jeffrey A Gblende
(74) *Attorney, Agent, or Firm* — Oblon, McClelland, Maier & Neustadt, L.L.P.

(57) ABSTRACT

A device, method, and non-transitory computer readable medium that determines a multilevel inverter circuitry comprising $N_{source}$ DC voltage sources and at least $2N_{source}+5$ controlled switching devices. The number of output voltage levels and the maximum output voltage of the multilevel inverter circuitry can be variable and depend on a trade-off among voltage rating of switches, variety of DC sources, and control strategy. A hybrid modulation scheme is employed to reduce the total harmonic distortions.

14 Claims, 11 Drawing Sheets

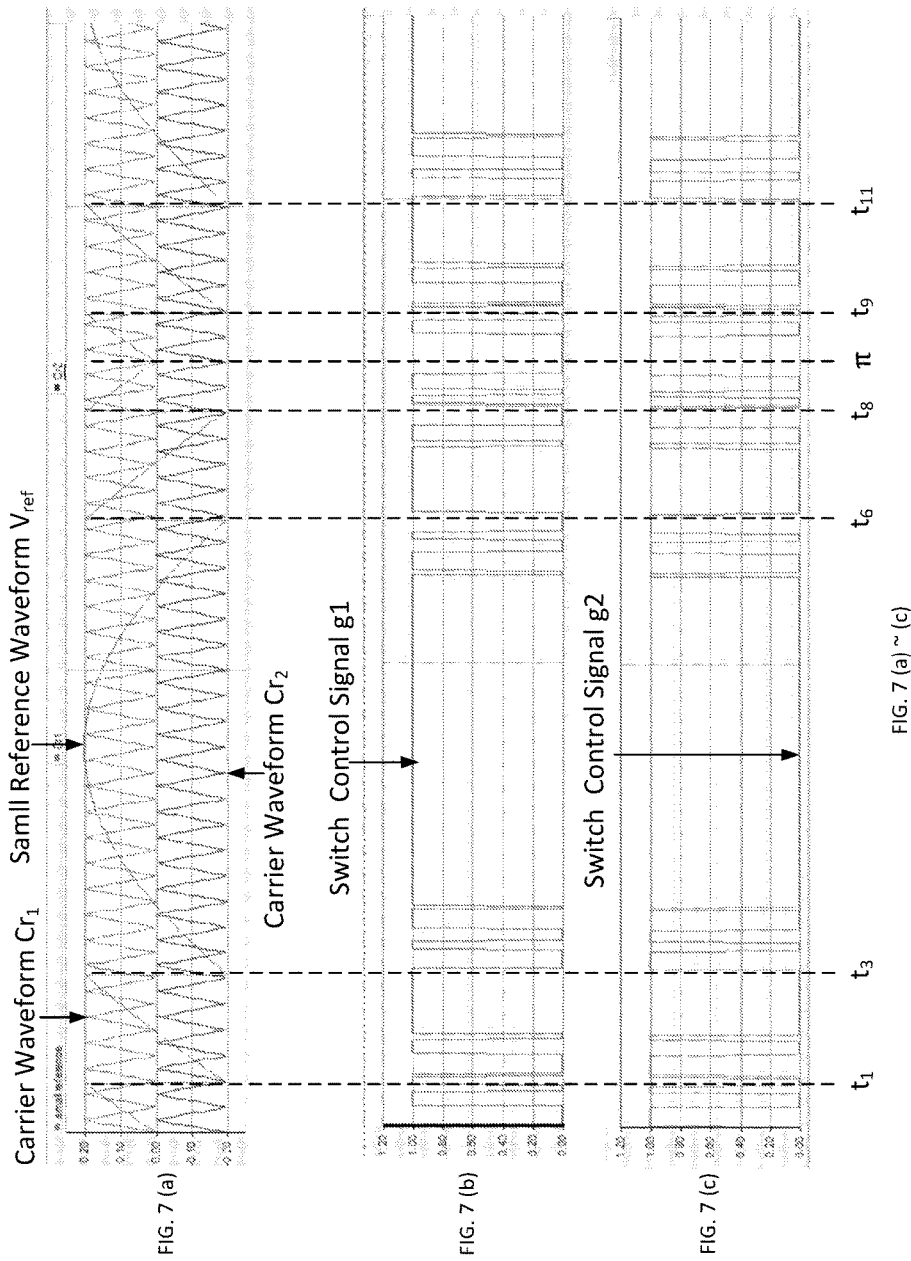
FIG. 7 (a) ~ (c)

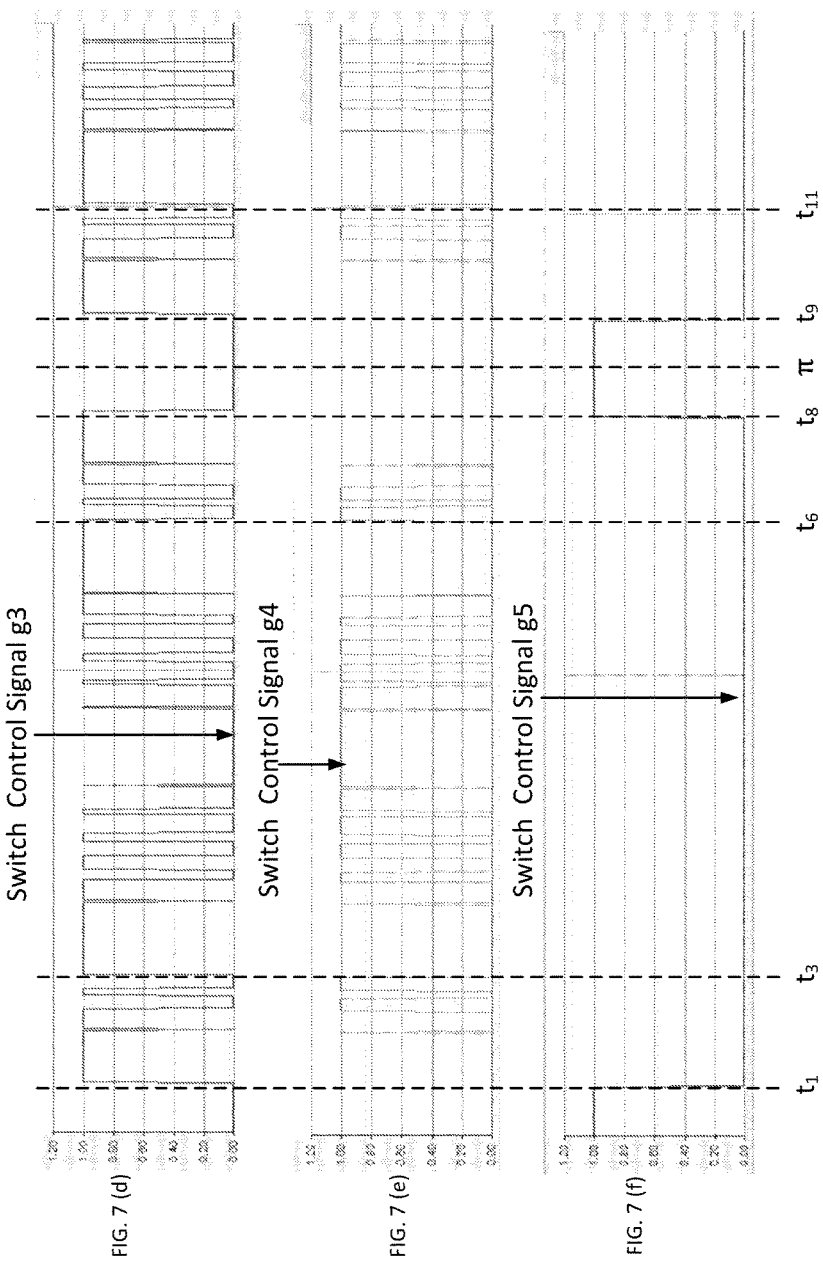

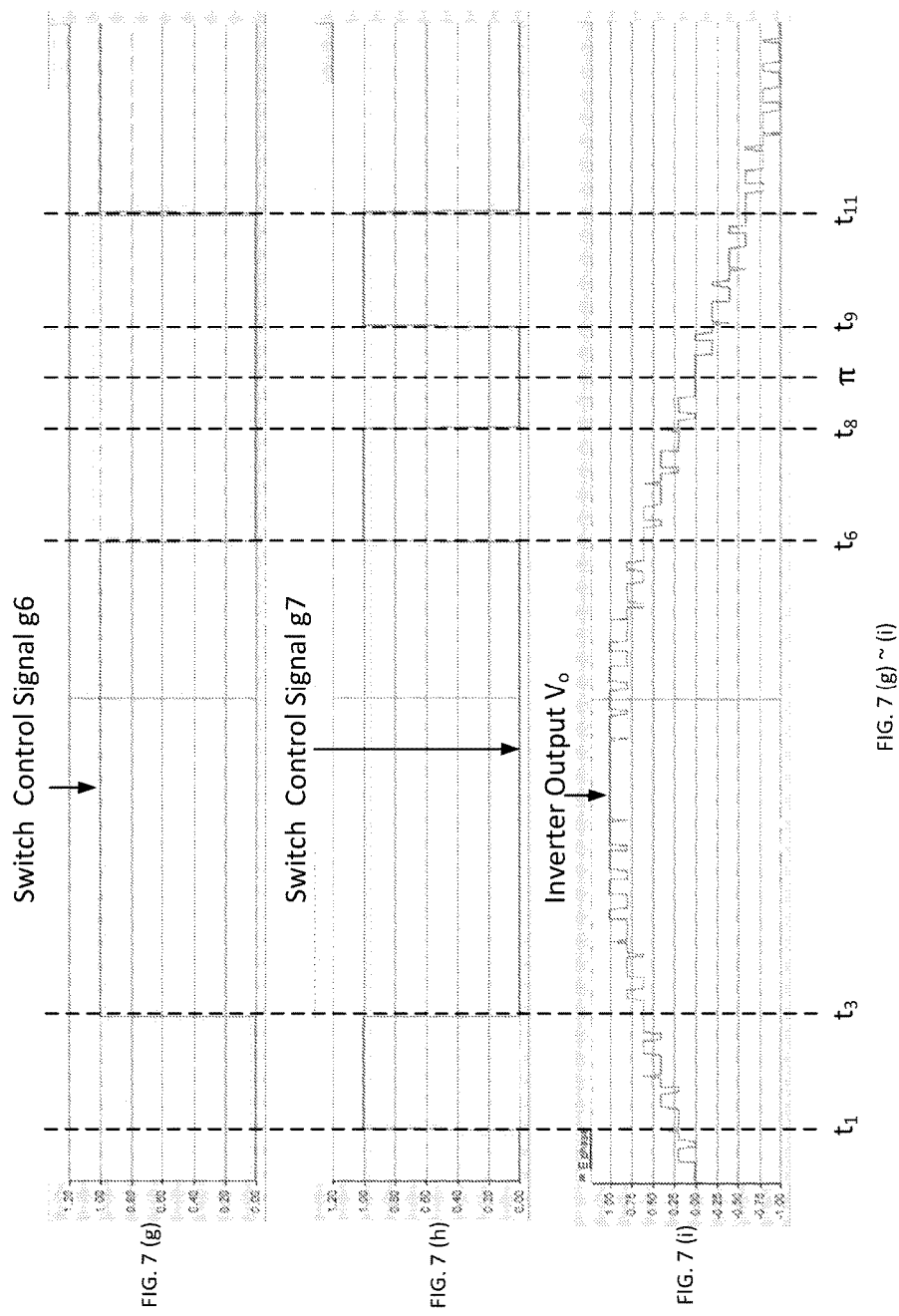

MULTILEVEL INVERTERS WITH INCREASED NUMBER OF OUTPUT STEPS

BACKGROUND

Technical Field

The present disclosure is directed to power conversion systems, and more particularly, to multilevel inverters for high voltage and high power applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Multilevel inverters have attracted the attention for many advantages such as its low output total harmonic distortion (THD), low switching device stress, and reduced switching stress as described by J. Zhao, X. He and R. Zhao, "Novel PWM Control Method for Hybrid-Clamped Multilevel Inverters," in IEEE Transactions on Industrial Electronics, vol. 75, no. 7, pp. 2365-2373, 2010. Furthermore, they have been increasingly employed in modern flexible AC transmission system (FACTS) to improve the quality of power systems as described by S. Chandrasekhar, J. Brahmmam and M. Srinu, "Mitigation of Voltage Flicker and Reduction in THD by using STATCOM," International Journal of Electrical and Computer Engineering (IJECE), vol. 3, no. 1, pp. 102-108, 2013, and G. F. Reed, B. M. Grainger, H. Bassi, E. Taylor, Z.-H. Mao and A. K. Jones, "Analysis of High Capacity Power Electronic Technologies for Integration of Green Energy Management," in Transmission and Distribution Conference and Exposition, 2010 IEEE PES, pp. 1-10, 2010. Multilevel inverters are also used in electric and hybrid electric vehicles but limitation of these devices is one of the issues that need to be solved as described by Y. Hinago and H. Koizumi, "A Single-Phase Multilevel Inverter Using Switched Series/Parallel DC Voltage Sources," IEEE Transactions on Industrial Electronics, vol. 57, no. 8, pp. 2643-2650, 2010. Series capacitors can be used at the input side to distribute the input voltage evenly among the switching devices. This leads to lower output voltage harmonics and less voltage stress across each switching device.

In general, three main types of multilevel inverters are Neutral-Point Clamped or diode-clamped (NPC) as described by G. P. Adam, S. J. Finney, A. M. Massoud and B. W. Williams, "Capacitor Balance Issues of the Diode-Clamped Multilevel Inverter Operated in a Quasi Two-State Mode," IEEE Transactions on Industrial Electronics, vol. 55, no. 8, pp. 3088-3099, 2008, and S. Daher, J. Schmid and F. L. M. Antunes, "Multilevel Inverter Topologies for Stand-Alone PV Systems," Transactions on Industrial Electronics, vol. 55, no. 7, pp. 2703-2712, 2008, Flying Capacitor (FC) as described by L. G. Franquelo, J. Rodriguez, J. I. Leon, S. Kouro, R. Portillo and M. A. M. Prats, "The Age of Multilevel Converters Arrives," IEEE Industrial Electronics Magazine, vol. 2, no. 2, pp. 28-39, 2008, and J. Huang and K. A. Corzine, "Extended Operation of Flying Capacitor Multilevel Inverters," IEEE Transactions on Power Electronics, vol. 21, no. 1, pp. 140-147, 2006, and cascaded H-bridge inverters as described by C. Rech and J. R. Pinheiro, "Hybrid Multilevel Converters: Unified Analysis and Design Considerations," IEEE Transactions on Industrial Electronics, vol. 54, no. 2, pp. 1092-1104, 2007, R. Gupta, A. Ghosh and A. Joshi, "Switching Characterization of Cascaded Multilevel-Inverter-Controlled Systems," IEEE Transactions on Industrial Electronics, vol. 55, no. 3, pp. 1047-1058, 2008, and S. Dasam and B. V. Sankerram, "Voltage Balancing Control Strategy in Converter System for Three-Level Inverters," International Journal of Electrical and Computer Engineering (IJECE), vol. 3, no. 1, pp. 7-14, 2013.

Various techniques for controlling multilevel inverters are described in H. M. Bassi, "Optimized Carrier-Based Pulse Width Modulation Technique with Double Switching Frequencies for Three-Phase Inverters," Power Engineering Conference (UPEC), 2015 50th International Universities, pp. 1-6, 2015, incorporated herein by reference in its entirety. One of the most commonly used techniques is Sinusoidal Pulse Width Modulation (SPWM) as described by A. Valderrabano-Gonzalez, J. M. Ramirez and F. Beltran-Carbajal, "Implementation of A 84-Pulse Voltage-Source Converter for Special Applications," IET Power Electronics, vol. 5, no. 7, pp. 984-990, 2012, and R. Rabinovici, D. Baimel, J. Tomasik and A. Zuckerberger, "Thirteen-Level Cascaded H-bridge Inverter Operated by Generic Phase Shifted," IET Power Electronics, vol. 6, no. 8, pp. 1516-1529, 2013, each incorporated herein by reference in its entirety.

To improve the sinusoidal waveform of the output voltage and decrease its harmonics content, the output levels of a multilevel inverter may be increased. One drawback of increasing the multilevel inverter output levels is the difficult balancing between the DC-link voltage and the increasing number of clamping diodes required in NPC and FC as described by X. Yuan and I. Barbi, "Fundamentals of A New Diode Clamping Multilevel Inverter," IEEE Transactions on Power Electronics, vol. 15, no. 4, pp. 711-718, 2000, and B. P. McGrath and D. G. Holmes, "Analytical Determination of the Capacitor Voltage Balancing Dynamics for Three-Phase Flying Capacitor Converters," IEEE Transactions on Industry Applications, vol. 45, no. 4, pp. 1425-1433, 2009, incorporated herein by reference in its entirety.

Accordingly, it is one object of the present disclosure to provide an improved multilevel inverter that produces more levels with a lower number of switching devices at the inverter output. The disclosure includes a circuit topology is based on SCSS multilevel inverter in which sources are divided into inner and outer groups.

SUMMARY

In an exemplary embodiment, a power conversion system comprises a multilevel inverter circuitry configured to arrange $N_{source}$ DC voltage sources in series between the positive terminal of the first one of the $N_{source}$ DC voltage source and the negative terminal of the last one of the $N_{source}$ DC voltage source; connect at least $N_{source}-1$ controlled switching devices to the $N_{source}$ DC voltage sources to ensure at least one controlled switching device connected between any two adjacent DC voltage sources, to form an electrical path between the positive terminal of the first one of the $N_{source}$ DC voltage source and the negative terminal of the last one of the $N_{source}$ DC voltage source; connect at least another $N_{source}-1$ controlled switching devices to the $N_{source}$ DC voltage sources to ensure at least one controlled switching device connected between the negative terminal of the last one of the $N_{source}$ DC voltage sources and the negative terminal of any one of the other $N_{source}-1$ DC voltage sources; provide at least another three controlled switching devices wherein at least one of these controlled switching devices connected between the positive terminal of the first DC voltage source and the positive terminal of the second DC voltage source, and at least two of these controlled switching devices connected across the positive terminal and negative terminal of the first DC voltage source; and connect an H-bridge circuit comprising at least four controlled switching devices between the negative terminal of the last DC voltage source and any common terminal of the controlled switching devices connected across the positive terminal and the negative terminal of the first DC voltage source, to drive the current in both positive and negative directions to a load.

In another exemplary embodiment, a method for providing a multilevel power inverter, the method comprises: arranging, via a processing circuitry, $N_{source}$ DC voltage sources in series between the positive terminal of the first one of the $N_{source}$ DC voltage source and the negative terminal of the last one of the $N_{source}$ DC voltage source; connecting, via a processing circuitry, at least $N_{source}-1$ controlled switching devices to the $N_{source}$ DC voltage sources to ensure at least one controlled switching device connected between any two adjacent DC voltage sources, to form an electrical path between the positive terminal of the first one of the $N_{source}$ DC voltage source and the negative terminal of the last one of the $N_{source}$ DC voltage source; connecting, via a processing circuitry, at least another $N_{source}-1$ controlled switching devices to the $N_{source}$ DC voltage sources to ensure at least one controlled switching device connected between the negative terminal of the last one of the $N_{source}$ DC voltage sources and the negative terminal of any one of the other $N_{source}-1$ DC voltage sources; providing, via a processing circuitry, at least another three controlled switching devices wherein at least one of these controlled switching devices connected between the positive terminal of the first DC voltage source and the positive terminal of the second DC voltage source, and at least two of these controlled switching devices connected across the positive terminal and negative terminal of the first DC voltage source; and connecting, via a processing circuitry, an H-bridge circuit comprising at least four controlled switching devices between the negative terminal of the last DC voltage source and any common terminal of the controlled switching devices connected across the positive terminal and the negative terminal of the first DC voltage source, to drive the current in both positive and negative directions to a load.

In another exemplary embodiment, a non-transitory computer readable medium storing computer-readable instructions therein which, when executed by a computer cause the computer to perform a method for providing a multilevel power inverter, the method comprises: arranging $N_{source}$ DC voltage sources in series between the positive terminal of the first one of the $N_{source}$ DC voltage source and the negative terminal of the last one of the $N_{source}$ DC voltage source; connecting at least $N_{source}-1$ controlled switching devices to the $N_{source}$ DC voltage sources to ensure at least one controlled switching device connected between any two adjacent DC voltage sources, to form an electrical path between the positive terminal of the first one of the $N_{source}$ DC voltage source and the negative terminal of the last one of the $N_{source}$ DC voltage source; connecting at least another $N_{source}-1$ controlled switching devices to the $N_{source}$ DC voltage sources to ensure at least one controlled switching device connected between the negative terminal of the last one of the $N_{source}$ DC voltage sources and the negative terminal of any one of the other $N_{source}-1$ DC voltage sources; providing at least another three controlled switching devices wherein at least one of these controlled switching devices connected between the positive terminal of the first DC voltage source and the positive terminal of the second DC voltage source, and at least two of these controlled switching devices connected across the positive terminal and negative terminal of the first DC voltage source; and connecting an H-bridge circuit comprising at least four controlled switching devices between the negative terminal of the last DC voltage source and any common terminal of the controlled switching devices connected across the positive terminal and the negative terminal of the first DC voltage source, to drive the current in both positive and negative directions to a load.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7(a) is a time chart which shows voltage waveforms of two carriers and a small reference of the exemplary controller of FIG. 6;

FIG. 7(b) is a time chart which shows a voltage waveform of the modulation signal $g_1$ of the exemplary controller of FIG. 6;

FIG. 7(c) is a time chart which shows a voltage waveform of the modulation signal $g_2$ of the exemplary controller of FIG. 6;

FIG. 7(d) is a time chart which shows a voltage waveform of the modulation signal $g_3$ of the exemplary controller of FIG. 6;

FIG. 7(e) is a time chart which shows a voltage waveform of the modulation signal $g_4$ of the exemplary controller of FIG. 6;

FIG. 7(f) is a time chart which shows a voltage waveform of the modulation signal $g_5$ of the exemplary controller of FIG. 6;

FIG. 7(g) is a time chart which shows a voltage waveform of the modulation signal $g_6$ of the exemplary controller of FIG. 6;

FIG. 7(h) is a time chart which shows a voltage waveform of the modulation signal $g_7$ of the exemplary controller of FIG. 6;

FIG. 7(i) is a time chart which shows a voltage waveform of the output voltage of the exemplary multilevel inverter of FIG. 4;

DETAILED DESCRIPTION

Figure 1:
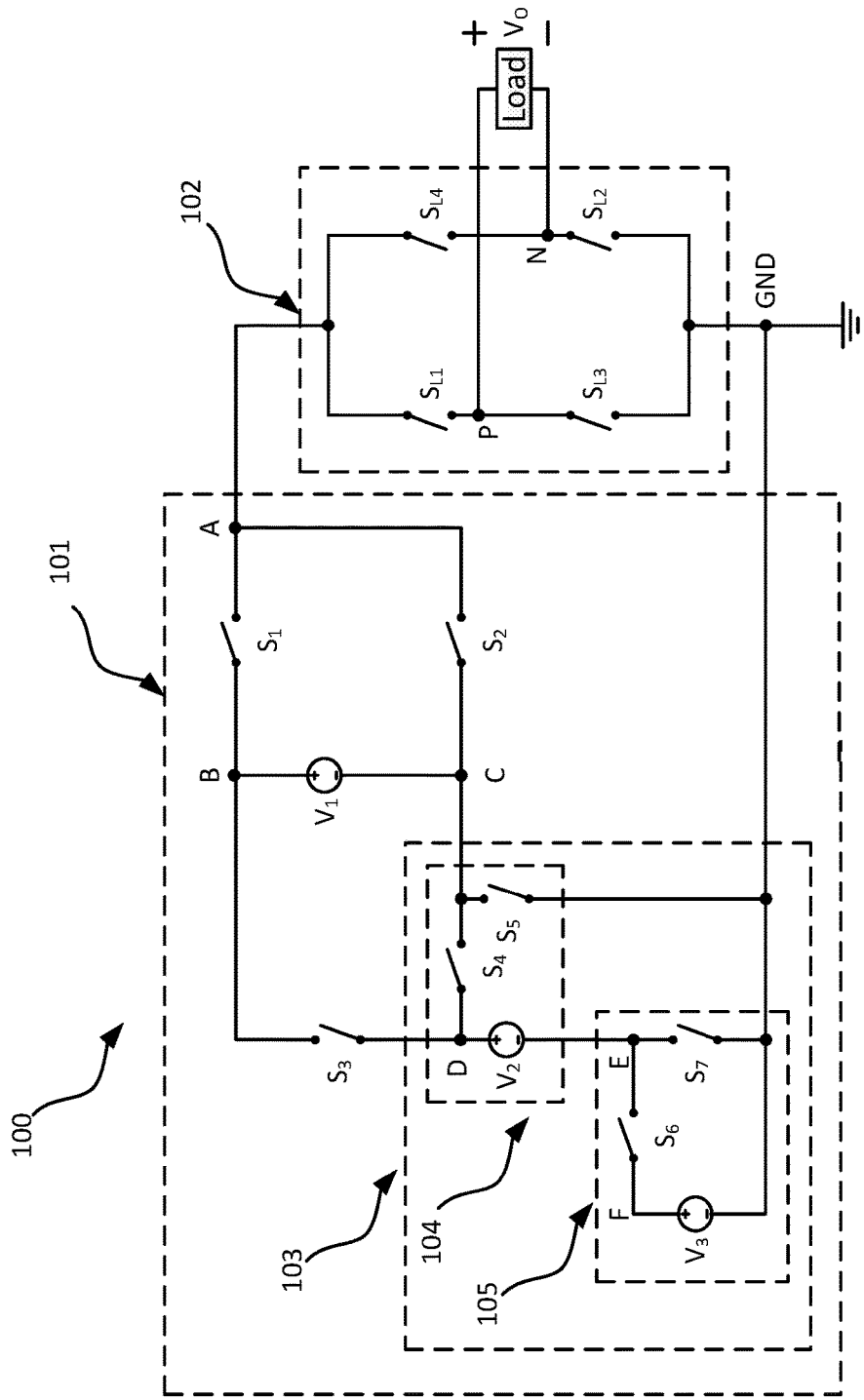
FIG. 1 is a simplified schematic circuit diagram which shows an exemplary 2-cell single phase multilevel inverter, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values there between.

Aspects of this disclosure are directed to a system, device, and method for converting DC to AC through a multilevel inverter with increased number of output steps. The generalized concept of the present disclosure, with suitable modifications, is applicable to various multilevel inverter topologies. The present disclosure will be described in detail herein with reference to the exemplary and preferred embodiments of a multilevel inverter topology with increased number of output steps, although the disclosure is not necessarily limited to such topologies.

FIG. 1 illustrates a simplified schematic circuit diagram which shows an exemplary 2-cell single phase multilevel inverter 100, according to certain embodiments. The 2-cell single phase multilevel inverter 100 comprises an outer DC source group 101 and an H-bridge network 102.

The function of the outer DC source group 101 is to build up square waveforms or blocks that are close in shape to the desired output sinusoidal waveforms. The outer DC source group 101 comprises a DC voltage source $V_1$ (e.g. a battery, solar cell, DC generator, or the like), three controlled switching devices $S_1$~$S_3$, and an inner DC source group 103. As shown in FIG. 1, the DC voltage source $V_1$ is provided between node B and node C; the controlled switching device $S_1$ is provided between node A and node B; the controlled switching device $S_2$ is provided between node A and node C; the controlled switching device $S_3$ is provided between node B and node D; and the inner DC source group 103 is provided between node C and node D.

The function of the inner DC source group 103 is to increase the number of the DC voltage levels to produce a smoother sinusoidal wave. This task can be accomplished by increasing the voltage levels provided by the DC source cells of the inner DC source group 103, and/or adding one or more additional DC source cells to inner DC source group 103. This will be explained in more detail below. As illustrated in FIG. 1, the inner DC source group 103 comprises a DC source cell 104 and a DC source cell 105 which is nested in the DC source cell 104. Each DC source cell comprises a DC voltage source and two controlled switching devices. In the DC source cell 104, a DC voltage source $V_2$ is provided between node D and node E; a controlled switching device $S_4$ is provided between node C and node D; and a controlled switching device $S_5$ is provided between node C and node GND which is a common ground node. In the DC source cell 105, a DC voltage source $V_3$ is provided between node F and node GND; a controlled switching device $S_6$ is provided between node E and node F; and a controlled switching device $S_7$ is provided between E and node GND.

Still referring to FIG. 1, an H-bridge network 102 is cascaded to the outer DC source group 101. The function of the H-bridge network 102 is to provide an output voltage across a load in both positive and negative amplitude. The H-bridge network 102 comprises four controlled switching devices $S_{L1}$, $S_{L2}$, $S_{L3}$, and $S_{L4}$. Specifically, the controlled switching device $S_{L1}$ is provided between node A and node P; the controlled switching device $S_{L2}$ is provided between node N and node GND; the controlled switching device $S_{L3}$ is provided between node P and node GND; and the controlled switching device $S_{L4}$ is provided between node A and node N. The controlled switching devices $S_{L1}$ and $S_{L2}$ are one group of switches and turned ON/OFF simultaneously while the controlled switching devices $S_{L3}$ and $S_{L4}$ are the other group of switches and turned ON/OFF simultaneously. However, $S_{L1}$ and $S_{L2}$ operate complementarily to $S_{L3}$ and $S_{L4}$, i.e., $S_{L1}$ and $S_{L2}$ are 180 degree out of phase to $S_{L3}$ and $S_{L4}$. Specifically, in the first half cycle of one period of an output voltage $V_o$, $S_{L1}$ and $S_{L2}$ are turned ON simultaneously while $S_{L3}$ and $S_{L4}$ are turned OFF simultaneously; in the second half cycle of the same period of an output voltage $V_o$, $S_{L1}$ and $S_{L2}$ are turned OFF simultaneously while $S_{L3}$ and $S_{L4}$ are turned ON simultaneously. An AC load is provided between node P and node N.

To prevent shorting circuit across a DC voltage source, the following constraints are preferably imposed in a switch control scheme:
(1) $S_1$ and $S_2$ can't be turned ON simultaneously;
(2) $S_3$ and $S_4$ can't be turned ON simultaneously;
(3) $S_4$ and $S_5$ can't be turned ON simultaneously; and
(4) $S_6$ and $S_7$ can't be turned ON simultaneously.

Under these switching constraints, selectively opening and/or closing the controlled switching devices $S_1$~$S_7$ can result in a specific voltage level. For example, if only switches $S_2$ and $S_5$ are closed, the H-bridge network 102 will be shorted and a zero voltage level will be given at output $V_o$. Another example is to only turn ON switches $S_1$, $S_4$, and $S_6$, a maximum output voltage level $V_{o,max}V_3+V_2+V_1$ will be given.

In addition, in order to generate more voltage levels without increasing the number of the switches and DC voltage sources, the voltage levels provided by the DC source cells of the inner DC source group can be variable. Table.1 lists the output voltage $V_o$ of the multilevel inverter 100 of FIG. 1 at different switching states when $V_2=V_3=2V_{dc}$. Thus the maximum output voltage level $V_{o,max}=5V_{dc}$ and the number of the voltage levels $N_{step}=11$.

It is noted that some redundant states, i.e. states which are able to achieve a same voltage level, are present in Table 1. The redundant states can effectively reduce voltage stress for switches and balance DC source voltage sharing and utilization.

TABLE 1

| State | Switches | $V_o$ | $V_1 = V_{dc}, V_2 = V_3 = 2V_{dc}$ |
|---|---|---|---|
| 1 | 2,5 | 0 | 0 |
| 2 | 1,5 | $V_1$ | $V_{dc}$ |
| 3 | 2,3,7 | $V_2 - V_1$ | $V_{dc}$ |
| 4 | 1,3,7 | $V_2$ | $2V_{dc}$ |
| 5 | 2,4,7 | | |
| 6 | 1,4,7 | $V_2 + V_1$ | $3V_{dc}$ |
| 7 | 2,3,6 | $V_3 + V_2 - V_1$ | $3V_{dc}$ |

TABLE 1-continued

| State | Switches | $V_0$ | $V_1 = V_{dc}$, $V_2 = V_3 = 2V_{dc}$ |
|-------|----------|-------|--------------------------------------|
| 8 | 1,3,6 | $V_3 + V_2$ | $4V_{dc}$ |
| 9 | 2,4,6 | | |
| 10 | 1,4,6 | $V_3 + V_2 + V_1$ | $5V_{dc}$ |

Figure 2:
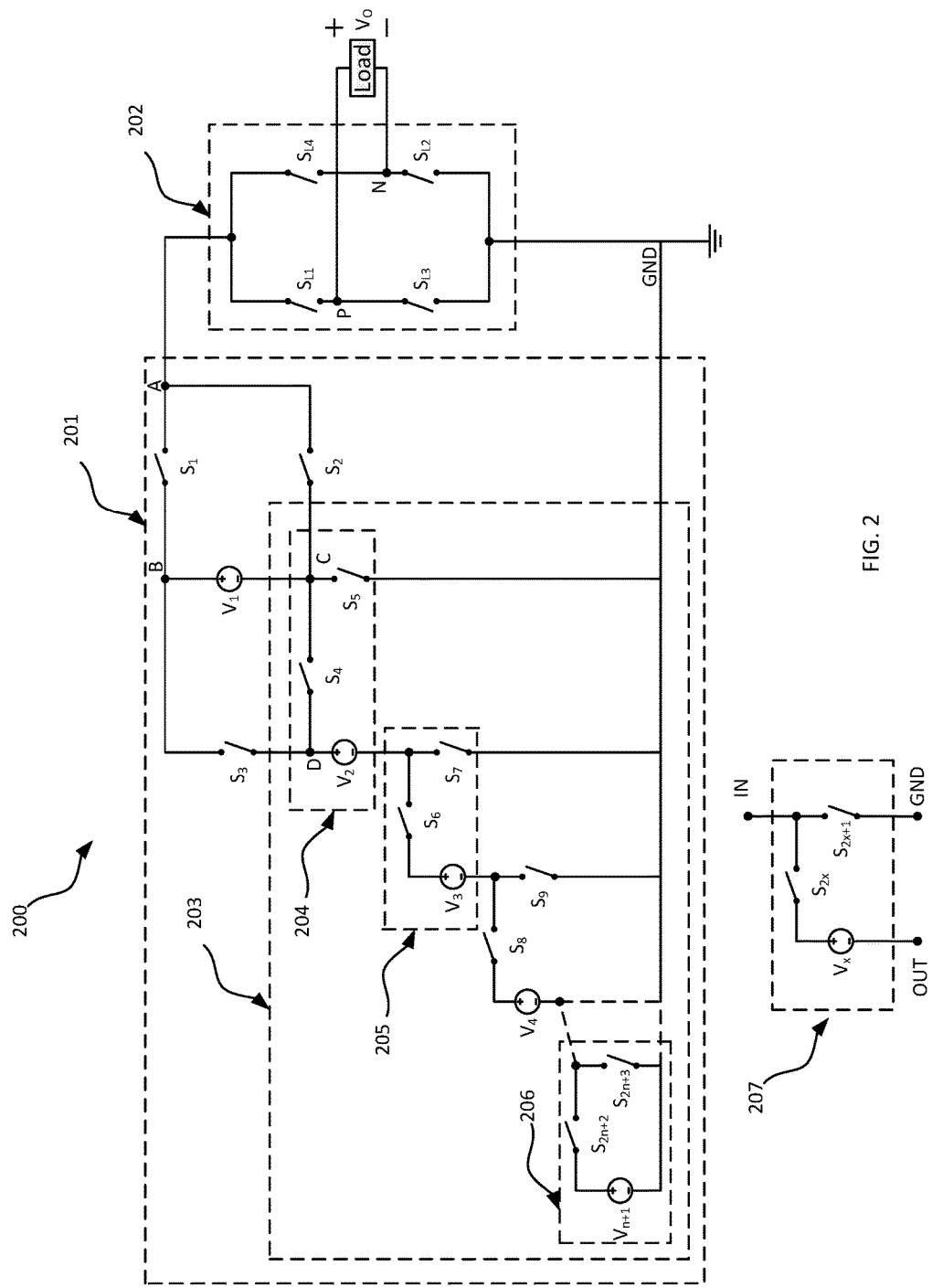
FIG. 2 is a simplified schematic circuit diagram which shows an exemplary n-cell single phase multilevel inverter topology, according to certain embodiments.

FIG. 2 illustrates a simplified schematic circuit diagram which shows an exemplary n-cell single phase multilevel inverter topology 200, according to certain embodiments. The multilevel inverter 200 comprises an outer DC source group 201 and an H-bridge network 202. The H-bridge network 202 is same with the H-bridge network 102 of the multilevel inverter 100 of FIG. 1. The outer DC source group 201 comprises a DC voltage source $V_1$, three controlled switching devices $S_1 \sim S_3$, and an inner DC source group 203. Similar to the component disposition of the multilevel inverter 100 of FIG. 1, the DC voltage source $V_1$ is provided between node B and node C; the controlled switching device $S_1$ is provided between node A and node B; the controlled switching device $S_2$ is provided between node A and node C; the controlled switching device $S_3$ is provided between node B and node D; and the inner DC source group 203 is provided between node C and node D. To prevent shoring circuit across the DC voltage source $V_1$, the controlled switches $S_1$ and $S_2$ can't operate simultaneously; the controlled switches $S_3$ and $S_4$ can't operate simultaneously either.

The inner DC source group 203 comprising n DC source cells is structured as follows: the outermost DC source cell 204 of the inner DC source group 203 nests the other n−1 DC source cells; the outermost DC source cell 205 of the remaining n−1 DC source cells nests the other n−2 DC source cells; and so on. FIG. 2 also illustrates a typical DC source cell 207 comprising a DC voltage source $V_x$ and two controlled switching devices $S_{2x}$ and $S_{2x+1}$. The DC voltage source $V_x$ and the controlled switching device $S_{2x}$ are connected in series between node IN and node OUT, and the controlled switching device $S_{2x+1}$ is provided between node IN and node GND which is a common ground terminal. To prevent shoring circuit across the DC voltage source $V_x$, the controlled switching devices $S_{2x}$ and $S_{2x+1}$ can't be turned ON/OFF simultaneously.

The structure of the inner DC source group 203 comprising n DC source cells can be described again as follows:
(1) Except the outermost DC source cell, i.e. the first DC source cell 204 (x=2), node IN of the xth DC source cell is connected to node OUT of the (x−1)th DC source cell;
(2) Except the innermost DC source cell, i.e. the last DC source cell 206 (x=n+1), node OUT of the xth DC source cell is connected to node IN of the (x+1)th DC source cell;
(3) For the outermost DC source cell, i.e. the first DC source cell 204 (x=2), node IN is connected to a common node between the DC voltage source $V_1$ and the controlled switch $S_2$ of the outer DC source group 201, i.e. node C; and a common node between the DC voltage source $V_2$ and the controlled switch $S_4$ of the first DC source cell 204, i.e. node D, is connected to one terminal of the controlled switch $S_3$ of which the other terminal is connected to a common node between the DC voltage source $V_1$ and the controlled switch $S_1$ of the outer DC group 201, i.e. node B; and
(4) For the innermost DC source cell, i.e. the last DC source cell 206 (x=n+1), node OUT is connected to node GND which is a common ground terminal.

Therefore, to increase the number of output voltage levels, more DC source cells can be added to the inner DC source group 203. In addition, it should be mentioned that the function of the DC voltage source $V_1$ together with the controlled switching devices $S_1 \sim S_4$ is to provide three voltage levels $+V_1$, 0, and $-V_1$ for any added DC source cell. Specifically, when the controlled switches $S_1$ and $S_3$ (or $S_2$ and $S_4$) are closed together, the DC voltage source $V_1$ is bypassed and thus a voltage level "0" is generated between node A and node D; when the controlled switches $S_1$ and $S_4$ are closed together, a voltage level "$+V_1$" is generated between node A and node D; and when the controlled switches $S_2$ and $S_3$ are closed together, a voltage level "$-V_1$" is generated between node A and node D.

Still referring to FIG. 2, the following equations can be used to calculate the number of the DC voltage sources $N_{source}$ and the number of the controlled switches $N_{switch}$ for the multilevel inverter 200 using the following equations, $$N_{source} = n+1 \quad (1)$$

$$N_{switch} = 2n+7 = 2N_{source}+5 \quad (2)$$

where n represents the number of the DC source cells of the inner DC source group 203. Thus, at least $2N_{source}+5$ controlled switching devices are needed for the multilevel inverter topology with $N_{source}$ DC voltage sources in present disclosure.

In the multilevel inverter 200, $V_1 = V_{dc}$, $V_2 = V_3 = \ldots = V_{n+1} = 2V_{dc}$, the number of the output voltage levels $N_{step}$ and the maximum magnitude of the output voltage $V_{o,max}$ are determined by the following equations, $$N_{step} = 4n + 3 = 4N_{source} - 1 \quad (3)$$

$$V_{o,max} = \sum_{k=1}^{n+1} V_k = (2n+1)V_{dc} = (2N_{source}-1)V_{dc} \quad (4)$$

When comparing the present disclosure with other topologies, it is straightforward to compare the relationships of the number of the controlled switches $N_{switch}$ and the number of the DC voltage sources $N_{source}$ with respect to the number of the output voltage levels $N_{step}$, respectively, according to the following equations, $$N_{switch} = \frac{N_{step} + 11}{2} \quad (5)$$

$$N_{source} = \frac{N_{step} + 1}{4} \quad (6)$$

Table 2 lists $N_{switch}$ and $N_{source}$ with respect of $N_{step}$ for four modern multilevel inverter (MLI) topologies: Switched Series/Parallel Sources (SSPS)-based MLI, Series-Connected Switched Sources (SCSS)-based MLI, Cascaded Bipolar Switched cells (CBSC)-based MLI, and Packed-U Cell (PUC)-based MLI. The present disclosure permits elimination of at least half of the switches and DC voltage sources in comparison to SSPS, SCSS, and CBSC. For a multilevel inverter in accordance with the present disclosure with a set of voltage levels $V_2 = V_3 = \ldots = V_{n+1} = 2V_{dc}$, the number of switches and DC voltage sources are comparable to those of PUC. Thus, the present disclosure is able to achieve same voltage levels with reduced number of switches and DC voltage sources comparing to these multilevel inverter topologies.

TABLE 2

| Topology | $N_{switch}$ | $N_{source}$ | $N_{variety}$ |
|---|---|---|---|
| SSPS | $\dfrac{3N_{step}}{2} + 1$ | $\dfrac{N_{step}}{2}$ | 1 |
| SCSS | $N_{step} + 3$ | $\dfrac{N_{step} - 1}{2}$ | 1 |
| PUC | $\dfrac{N_{step} + 5}{2}$ | $\dfrac{N_{step} + 1}{4}$ | $\dfrac{N_{step} + 1}{4}$ |
| CBSC | $(N_{step} + 1)^*$ | $\dfrac{N_{step} - 1}{2}$ | 1 |

*Bidirectional switches

It is also important to evaluate the variety of the voltage levels provided by the DC voltage sources $N_{variety}$ and the blocking voltage levels of switches $V_{block}$ as these parameters may be used to determine the total cost for any multilevel inverter. To decrease the total cost of an inverter, $N_{variety}$ and $V_{block}$ are preferably reduced. For the present disclosure, $N_{variety}$ is given by the following equation, $$N_{variety} = 2 \quad (7)$$

With $E_n$ denotes the blocking voltage of switch $S_n$, $V_{block,n}$ can be calculated using the following steps. For a multilevel inverter with an inner DC source group comprising two DC source cells, i.e. n=2, $E_n$ and $V_{block,2}$ are determined by the following equations, $$E_1 = E_2 = V_{dc} \quad (8)$$

$$E_3 = 2V_{dc} \quad (9)$$

$$E_4 = E_7 = 2V_{dc} \quad (10)$$

$$E_5 = (2 \times 2) V_{dc} \quad (11)$$

$$E_6 = (2 \times 1) V_{dc} \quad (12)$$

$$E_{S1} = E_{S2} = E_{S3} = E_{S4} = 5V_{dc} \quad (13)$$

$$V_{block,2} = E_1 + E_2 + E_3 + E_4 + E_5 + E_6 + E_7 + E_{S1} + E_{S2} + E_{S3} + E_{S4} = 34 V_{dc} \quad (14)$$

For a multilevel inverter with an inner DC source group comprising three DC source cells, i.e. n=3, $E_n$ and $V_{block,2}$ are determined by the following equations, $$E_1 = E_2 = V_{dc} \quad (15)$$

$$E_3 = 2V_{dc} \quad (16)$$

$$E_4 = E_7 = E_9 = 2V_{dc} \quad (17)$$

$$E_5 = (2 \times 3) V_{dc} \quad (18)$$

$$E_6 = (2 \times 2) V_{dc} \quad (19)$$

$$E_8 = (2 \times 1) V_{dc} \quad (20)$$

$$E_{S1} = E_{S2} = E_{S3} = E_{S4} = 7 V_{dc} \quad (21)$$

$$V_{block,3} = E_1 + E_2 + E_3 + E_4 + E_5 + E_6 + E_7 + E_8 + E_9 + E_{S1} + E_{S2} + E_{S3} + E_{S4} = 50 V_{dc} \quad (22)$$

In general, therefore, $V_{block,n}$ is determined by the following equation:

$$V_{block,n} = 2\left(n^2 + 6n + 4 - \sum_{k=1}^{n} k\right) V_{dc} \quad (23)$$

Figure 3:
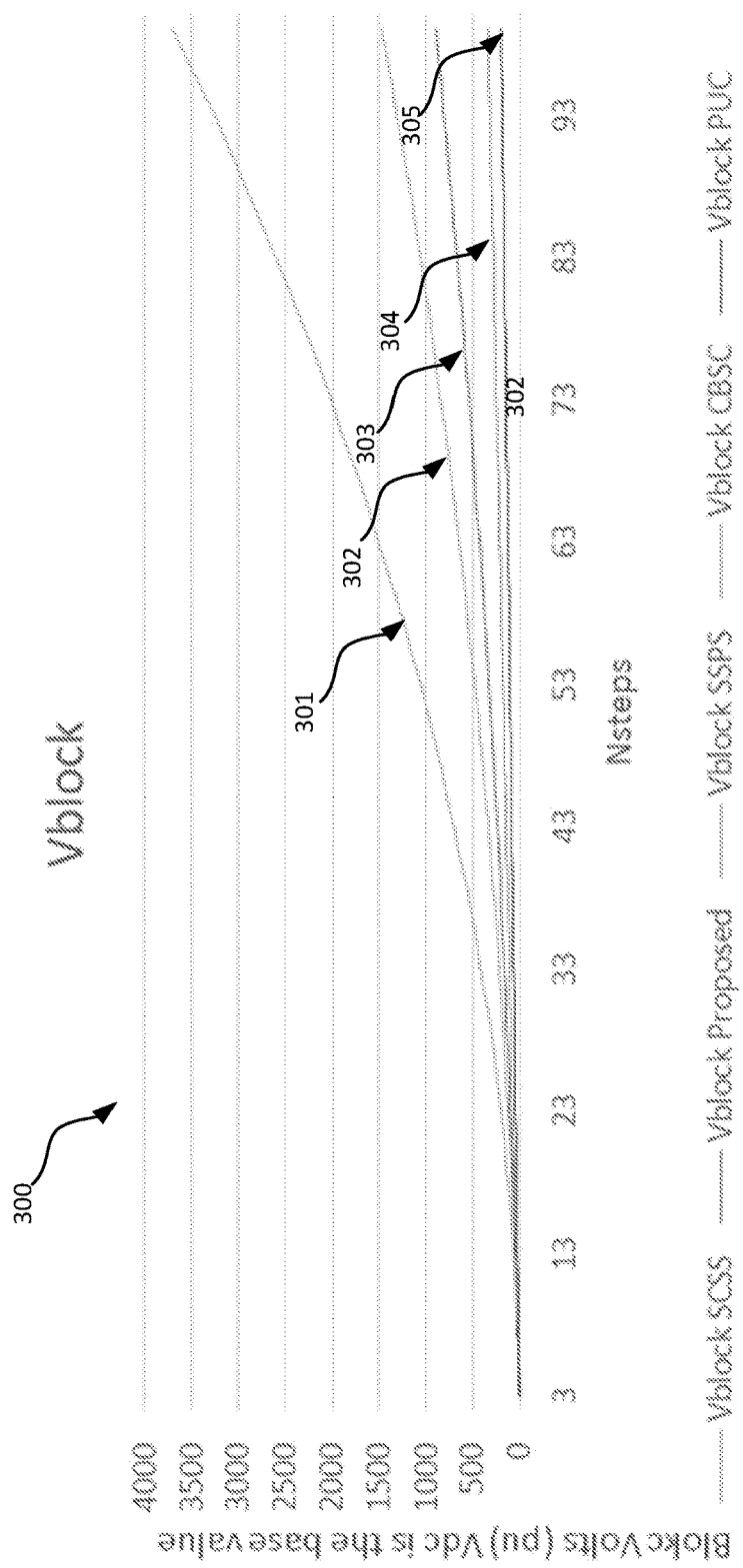
FIG. 3 is a chart which compares the blocking voltages of different topologies.

FIG. 3 illustrates a comparison of blocking voltage for different topologies. The traces 301~305 in the plot 300 represent the total blocking voltages of CBSC-based MLI, SCSS-based MLI, the proposed topology, SSPS-based MLI, and PUC-based MLI, respectively. As the number of output voltage levels $N_{step}$ increases, the total blocking voltage of each topology also increases. It is obviously shown that the present disclosure surpasses CBSC-based MLI and SCSS-based MLI as $N_{step}$ increases.

Any suitable type of controlled switching devices may be used in the multilevel inverter topology disclosed herein, including without limitation semiconductor-based devices such as Insulated-Gate Bipolar Transistors (IGBTs), Metal-Oxide-Semiconductor Field-Effect Transistors (MOSFETs), Integrated Gate-Commutated Thyristors (IGCTs), Gate Turn-Off Thyristors (GTOs), Silicon Controlled Rectifier (SCRs), or other types. In addition, a controlled switching device usually includes an anti-parallel diode to conduct reverse current when the switch is OFF.

Figure 4:
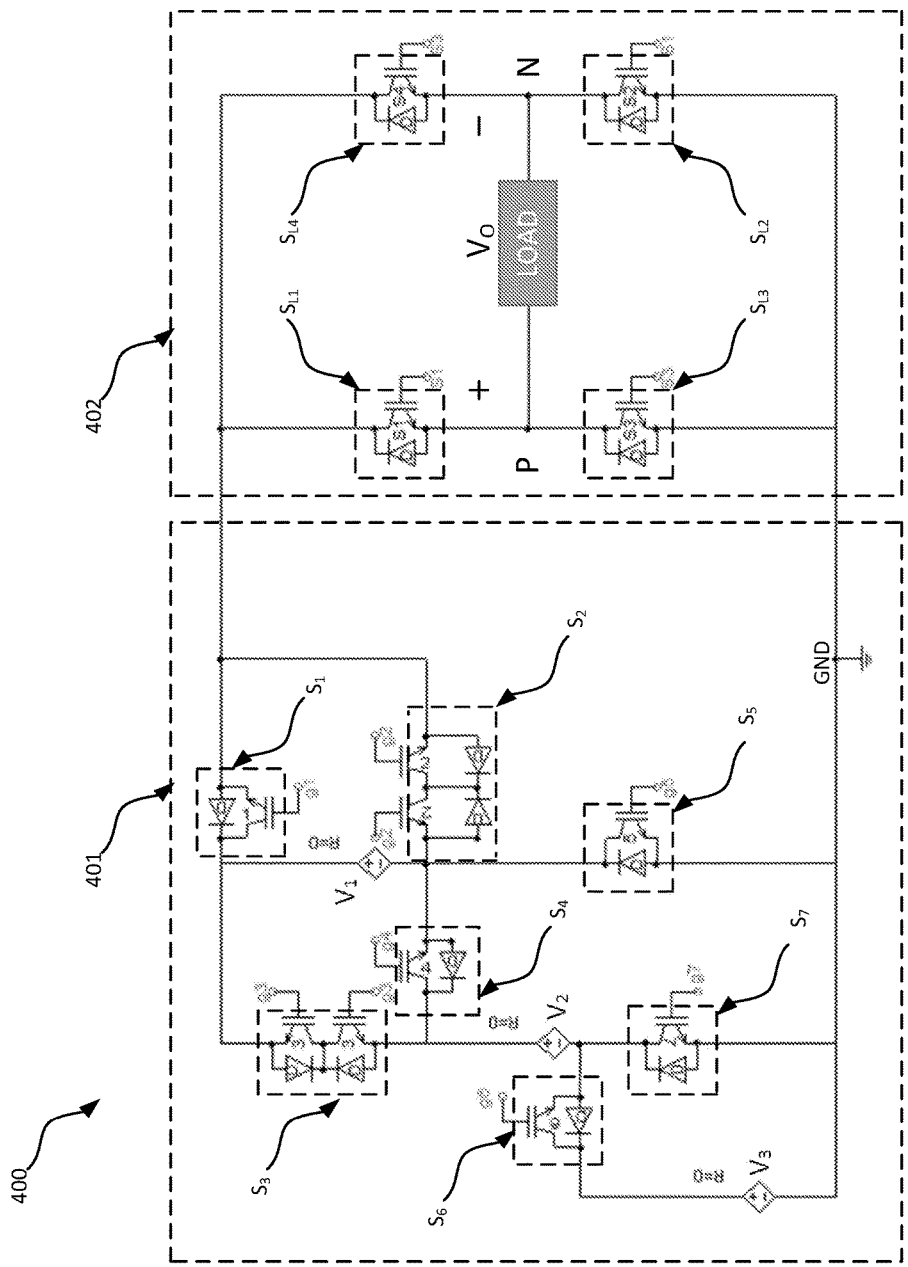
FIG. 4 is a circuit schematic which shows an exemplary embodiment in accordance with the multilevel inverter circuit of FIG. 1.

FIG. 4 illustrates a circuit schematic which shows an exemplary embodiment 400 in accordance with the multilevel inverter circuit 100 of FIG. 1. In the embodiment 400, the controlled switching devices $S_2$ and $S_3$ of the outer DC source group 401 are bidirectional and other controlled switching devices are unidirectional. A bidirectional switch is formed by connecting the collectors of two unidirectional switches together. In another embodiment, the controlled switching devices $S_2$ and $S_3$ of the outer DC source group 401 may be unidirectional if the load is a pure resistance. These controlled switching devices $S_1$~$S_7$ of the outer DC source group 401 in this embodiment are controlled by a controller 600 of FIG. 6 through control signals g1~g7. The controlled switching devices $S_{L1}$ and $S_{L2}$ of the H-bridge network 402 are controlled by the same controller 600 through control signal S1 and the controlled switching devices $S_{L3}$ and $S_{L4}$ are controlled through control signal S3. The operation of the controller 600 of FIG. 6 will be described in more detail below.

Figure 5:
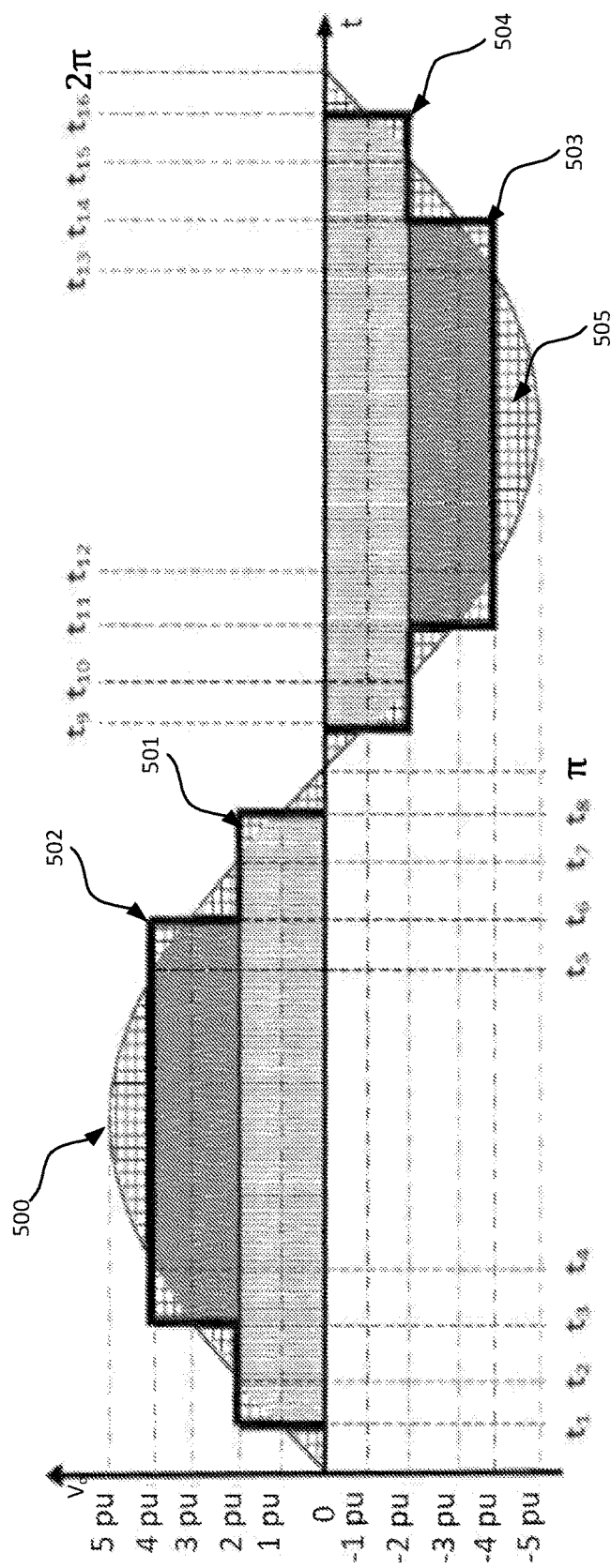
FIG. 5 is a time chart which shows a desired sinusoidal waveform with two blocks in each half-cycle, according to certain embodiments.

FIG. 5 illustrates a desired output voltage waveform 500 with two voltage blocks and in each half cycle for the multilevel inverter 400 of FIG. 4, according to certain embodiments. This 11-level waveform corresponds to one set of DC voltage level combination in which $V_1=1V_{dc}$ (or 1 pu, i.e. per unit), $V_2=V_3=2V_{dc}$ and thus the maximum output voltage level $V_{o,max}=5V_{dc}$, as shown in the y-axis of FIG. 5 and the switching states are shown in Table.1. The peak voltage levels of two voltage blocks 501 and 502 are $2V_{dc}$ and $4V_{dc}$, respectively, which are provided by $V_2$ and $V_2+V_3$. To obtain such a desired sinusoidal waveform 500, the controller 600 of FIG. 6 employs a hybrid modulation scheme, with which the controlled switches of the multilevel inverter 400 can be operated at different frequencies. For example, the switches $S_5$~$S_7$ can be operated at low frequencies to provide long working periods for the DC voltage sources $V_2$ and $V_3$ to form the voltage blocks 501 and 502, but the switches $S_1$~$S_4$ should be operated at high frequencies to provide fast switching among three voltage levels $+V_1$, 0, and $-V_1$ which are superposed on a block voltage level to form an instantaneous voltage level of the output voltage $V_o$. The hybrid modulation scheme for modulating the controlled switches of the outer DC source group 401 of FIG. 4 can be obtained by summing the areas shaded with large grid pattern 505 in the waveform of FIG. 5 using the following equation, $$V_{ref} = |V_1 \sin(2\pi ft)| - 0.4\{[u(t-t_1)+u(t-t_3)+u(t-t_9)+u(t-t_{11})] - [u(t-t_6)+u(t-t_8)+u(t-t_{14})+u(t-t_{16})]\} \quad (24)$$

where u(t) is a unit step function, and $|V_1 \sin(2\pi ft)|$ and $V_{ref}$ are called reference voltage and small reference voltage in present disclosure.

The small reference voltage $V_{ref}$ consists of two parts: one is the reference voltage $|V_1 \sin(2\pi ft)|$ and the other one is a set of step functions. The reference voltage $|V_1 \sin(2\pi ft)|$ is an absolute value of the desired output voltage 500 and represents a desired instantaneous voltage magnitude of the output voltage. The set of step functions represents voltage magnitudes of the four voltage blocks 501~504 in one cycle, for example, the voltage block 501 is represented by $0.4[u(t-t_1)-u(t-t_8)]$, and the voltage block 502 is represented by $0.4[u(t-t_3)-u(t-t_6)]$, etc. Thus the small reference voltage $V_{ref}$ can be expressed as follows:

$$t_1 \sim t_3 : V_{ref} = |V_1 \sin(2\pi ft)| - 0.4 \quad (1)$$

$$t_3 \sim t_6 : V_{ref} = |V_1 \sin(2\pi ft)| - 0.8 \quad (2)$$

$$t_6 \sim t_8 : V_{ref} = |V_1 \sin(2\pi ft)| - 0.4 \quad (3)$$

$$t_8 \sim t_9 : V_{ref} = |V_1 \sin(2\pi ft)| \quad (4)$$

$$t_9 \sim t_{11} : V_{ref} = |V_1 \sin(2\pi ft)| - 0.4 \quad (5)$$

$$t_{11} \sim t_{14} : V_{ref} = |V_1 \sin(2\pi ft)| - 0.8 \quad (6)$$

$$t_{14} \sim t_{16} : V_{ref} = |V_1 \sin(2\pi ft)| - 0.4 \quad (7)$$

$$t_{16} \sim 2\pi : V_{ref} = |V_1 \sin(2\pi ft)| \quad (8)$$

In addition, considering that the voltage level of the block 501 is 0.4V, corresponding to 2 pu (or $2V_{dc}$) in FIG. 5, the maximum output voltage level of the desired voltage waveform 500 is $5V_{dc}$ (or 5 pu) so that $V_1 = 1V$ in equation (24) and the peak voltage of the small reference voltage $V_{ref}$ is 0.2V, as shown in FIG. 7(a).

To obtain a general expression for the small reference voltage $V_{ref}$, it is required to find the number of blocks per half cycle $N_{core}$ using the following equation, $$N_{core} = n = N_{source} - 1 \quad (25)$$

where n represents the number of cells in the inner DC group. In order to obtain the interval for each block, it is necessary to calculate the peak of the blocks $V_{core}$ and the number of starts and ends of the blocks per half cycle $T_{core}$, (e.g., $t_1$ and $t_3$ in the waveform 500 of FIG. 5) using the following equations, $$V_{core} = \frac{V_1}{N_{core} + 0.5} \quad (26)$$

$$T_{core} = 4 N_{core} \quad (27)$$

Therefore, the general expression of $V_{ref}$ is $$V_{ref} = |V_1 \sin(2\pi ft)| - V_{core} \quad (28)$$

$$\left[ \sum_{i=1,3,5,\ldots}^{\frac{T_{core}}{2}-1} [u(t-t_i) + u(t-t_{i+T_{core}})] - \sum_{i=0,2,4,\ldots}^{\frac{T_{core}}{2}-2} [u(t-t_{T_{core}-i}) + u(t-t_{2T-core-i})] \right]$$

The small reference voltage $V_{ref}$ is modulated using two triangular carrier voltages $Cr_1$ and $Cr_2$ and the modulation index m is defined as:

$$m = \frac{V_{ref}(\text{peak})}{Cr_{1,2}(\text{peak})} \quad (29)$$

where $0 \leq m \leq 1$. For the embodiment 400 of FIG. 4, $N_{cells}=2$, $N_{core}=2$, $V_{core}=0.4$, and $T_{core}=8$. Total Harmonic Distortion (THD) is one of the major key performance factors to evaluate the performance of the output waveform and can be calculated using the following equation, $$THD = \frac{\sqrt{\left(\sum_{n=3,5,7,\ldots}^{\infty} b_n\right)}}{b_1} \quad (30)$$

where $b_n$ is obtained using the following equation, $$b_n = \frac{4V_{dc}}{n\pi} \left[ 1 + \sum_{i=1}^{N_{levels}-2} \cos(n\alpha_i) \right] \text{ for } n \text{ odd} \quad (31)$$

where $\alpha_i$ is the angle where the switching occurs.

Figure 6:
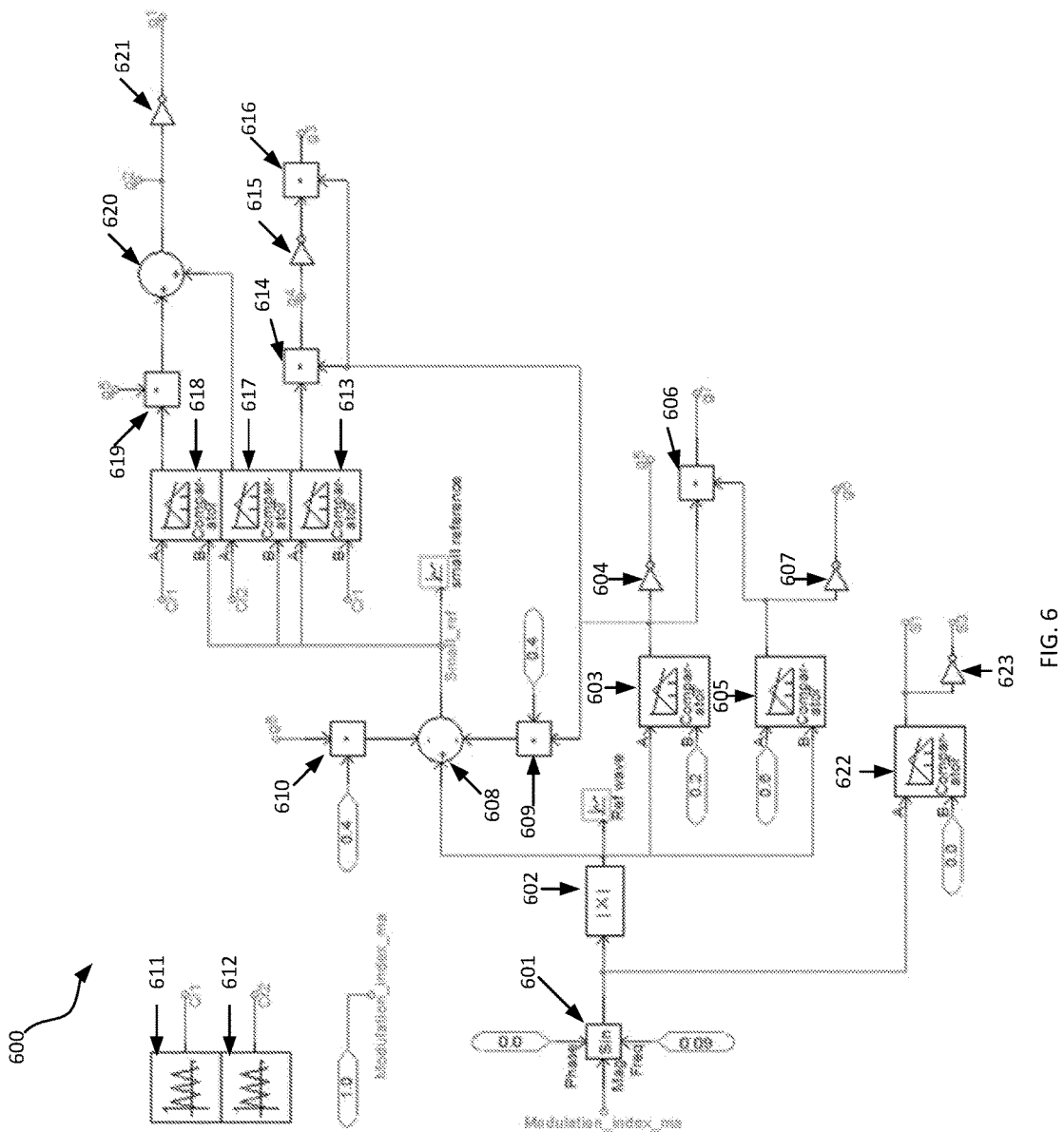
FIG. 6 is a circuit block diagram which shows a controller for providing modulation signals for the switching devices of the exemplary multilevel inverter of FIG. 4.

FIG. 6 illustrates a schematic block diagram of an exemplary controller 600 for modulating the switching devices of the exemplary multilevel inverter 400 of FIG. 4. The exemplary controller 600 was simulated with the multilevel inverter 400 and the simulation results are shown in FIGS. 7(a)~7(i). Specifically, FIG. 7(a) illustrates a time chart which shows simulated voltage waveforms of two carrier voltages Cr1/Cr2 and a small reference voltage $V_{ref}$ of the exemplary controller 600 of FIG. 6; FIGS. 7(b)~7(h) are time charts which show simulated voltage waveforms of the modulation signals g1~g7 of the exemplary controller 600 of FIG. 6; and FIG. 7(i) is a time chart which shows a simulated voltage waveform of the output voltage $V_o$ of the exemplary multilevel inverter 400 of FIG. 4.

The operation of the exemplary controller 600 is based on equation (24) and will be described with reference to FIGS. 4~7. In equation (24), the small reference voltage $V_{ref}$ comprises two parts: the reference voltage $|V_1 \sin(2\pi ft)|$ and a set of step functions.

The first part, i.e. the reference voltage $|V_1 \sin(2\pi ft)|$ is generated by a sinusoidal wave generator 601 followed by an absolute value circuitry 602. First, a sinusoidal signal $V_1 \sin(2\pi ft)$ corresponding in frequency and phase to the desired output voltage waveform 500 of FIG. 5 is provided by the sinusoidal wave generator 601, as shown in FIG. 6. In this embodiment, the modulation index m of the sinusoidal signal is set to be 1, which means the peak voltage of the small reference voltage $V_{ref}$ is the same as the peak voltages of the carrier voltages Cr1/Cr2. The phase and the frequency of the sinusoidal signal $V_1 \sin(2\pi ft)$ are set to be 0° and 60 Hz, respectively. Then the sinusoidal signal $V_1 \sin(2\pi ft)$ is input to an absolute value circuitry 602 to derive the reference voltage $|V_1 \sin(2\pi ft)|$, where the amplitude $V_1=1$ in the simulation.

The second part, i.e. a set of step functions or the block voltages, is generated by the DC source voltage $V_2$ and $V_3$ of FIG. 4. Referring back to FIG. 5, the peak voltage levels of two voltage blocks 501 and 502 are provided by $V_2$ and $V_2+V_3$. Therefore the states in Table.1 can be classified into three categories as follows: states 1 and 2 comprising only 0 and $V_1$; states 3~6 comprising $V_1$ and $V_2$; and states 7~10 comprising $V_1$, $V_2$, and $V_3$. It is obviously found that switch $S_5$ is only operated in states 1 and 2, and switch $S_7$ is only operated in states 3~6, and switch $S_6$ is only operated in states 7~10. In more detail, the generation of the set of step functions can be described by the following operations:

(1) In the states 1 and 2, corresponding to the time slots $0~t_1$ and $t_8~t_9$ as well as $t_{16}~2\pi$, only the DC voltage source $V_1$ is employed, thus the switch $S_5$ is closed and the switches $S_1$ and $S_2$ are alternatively and complementarily switched, but other switches are open to avoid short circuit or DC source sharing.

(2) In the states 3~6, corresponding to the time slots $t_1~t_3$, $t_6~t_7$, $t_9~t_{11}$, and $t_{14}~t_{16}$, both DC voltage sources $V_1$ and $V_2$ are employed, thus the switch $S_7$ is closed, and the switches $S_1$ and $S_2$ are alternatively and complementarily switched, and the switches $S_3$ and $S_4$ are alternatively and complementarily switched, but other switches are open to avoid short circuit or DC source sharing.

(3) In the states 7~10, corresponding to the time slots $t_3~t_6$ and $t_{11}~t_{14}$, three DC voltage sources $V_1~V_3$ are employed, thus the switch S6 is closed, and the switches $S_1$ and $S_2$ are alternatively and complementarily switched, and the switches $S_3$ and $S_4$ are alternatively and complementarily switched, but other switches are open to avoid short circuit or DC source sharing.

From the operations described above, it is clearly seen that the switches $S_5~S_6$ can be operated at low frequencies to provide long working periods for the DC voltage sources $V_2$ and $V_3$ to form the voltage blocks, but the switches $S_1~S_4$ should be operated at high frequencies to provide fast switching among three voltage levels $+V_1$, 0, and $-V_1$ which are superposed on a block voltage level to form an instantaneous voltage level of the output voltage $V_o$. Thus the generation of the control signals can also be classified into two groups: low frequency signals g5~g7 for controlling the switches $S_5~S_7$ and high frequency signals g1~g4 for controlling the switches $S_1~S_4$.

The implementation details to generate the low frequency signals g5~g7 will be firstly described with reference to FIGS. 4~7 now.

Referring back to FIG. 5, it is shown that if the magnitude of the desired instantaneous voltage level of the output voltage is below 1 pu (0.2V), the switch $S_5$ will be closed. In the controller 600 of FIG. 6, the control signal g5 is generated by using a comparator 603 having a threshold voltage level of 0.2V and a logic inverter 604. If the reference wave $|V_1 \sin(2\pi ft)|$ is below 0.2V, the comparator 603 will output logic "Low" (or logic "0", or logic "False", or the like) and hence the inverter 604 will output logic "High" (or logic "1", or logic "True", or the like), otherwise the inverter 604 will output logic "Low". The simulated voltage waveform of the control signal g5 generated at the output of the logic inverter 604 is shown in FIG. 7(f).

If the magnitude of the desired instantaneous voltage level of the output voltage is between 1 pu (0.2V) and 3 pu (0.6V), the switch $S_7$ will be closed. In the controller 600, the control signal g7 is generated by using a comparator 605 having a threshold voltage level of 0.6V and a multiplying circuitry 606 as well as the comparator 603. If the reference wave $|V_1 \sin(2\pi ft)|$ is between 0.2V and 0.6V, both comparators 603 and 605 will output logic "High" and hence the multiplying circuitry 606 will output logic "High", otherwise the multiplying circuitry will output logic "Low". The simulated voltage waveform of the control signal g7 generated at the output of the multiplying circuitry is shown in FIG. 7(h).

If the magnitude of the desired instantaneous voltage level of the output voltage is above 3 pu (0.6), the switch S6 will be closed. In the controller 600, the control signal g6 is generated by using the comparator 605 and a logic inverter 607. If the reference wave $|V_1 \sin(2\pi ft)|$ is above 0.6V, the comparator 605 will output logic "Low" and hence the inverter 607 will output logic "High", otherwise the inverter 604 will output logic "Low". The simulated voltage waveform of the control signal g6 generated at the output of the logic inverter 604 is shown in FIG. 7(g).

As shown in FIGS. 7(f)~7(i), the switching frequencies of the control signals g5~g7 are comparable to that of the output voltage, so switching devices with capability of high blocking voltage may be preferred, such as GTOs or IGCTs.

The implementation details to generate the high frequency signals g1~g4 will be then described with reference to FIGS. 4~7 now.

Referring to FIG. 7(a)~7(e), a sinusoidal pulse width modulation (SPWM) technique is used to generate the control signals g1~g4. The SPWM technique continuously compares the small reference voltage $V_{ref}$ in equation (24) with two triangle carrier voltages Cr1 and Cr2.

In the controller 600 of FIG. 6, the small reference voltage $V_{ref}$ is generated by subtracting circuitry 608 which subtracts the output voltages of two multiplying circuitries 609 and 610 from the reference voltage $|V_1 \sin(2\pi ft)|$ generated at the output of the absolute value circuitry 602. It is noted that the signal timing of the reverse signal of the control signal g5 is the same as that of the voltage block 501 of FIG. 5. Thus the output of the multiplying circuitry 609 represents the voltage block 501 by scaling the voltage level of the reverse signal of the control signal g5 by 0.4 times. Similarly, the output of the multiplying circuitry 610 represents the voltage block 502 by scaling the voltage level of the control signal g6 having the same signal timing with the voltage block 502. Thus the sum of the outputs of the multiplying circuitries 609 and 610 represent the set of the step functions, i.e. the second part of the small reference voltage $V_{ref}$ in equation (24). As shown in equation (24), the peak voltage of the small reference voltage $V_{ref}$ is 0.2V.

The triangle carrier voltages Cr1 and Cr2 are generated from two triangle wave generators 611 and 612, respectively. It is noted that both Cr1 and Cr2 have the same frequency and amplitude, and their DC levels are relatively shifted to each other. Since the modulation index m=1, the peak amplitude of each carrier is 0.2V, the same as that of the small reference voltage $V_{ref}$. One carrier Cr1 is centered in 0.1V and the other carrier Cr2 is centered in −0.1V to completely modulate the small reference voltage $V_{ref}$ which is centered in the middle of two carriers.

Referring back to Table.1, it is known the operation of the switches $S_1~S_4$ is able to provide three voltage levels: $-V_1$, 0, and $+V_1$. Specifically, when the switches $S_2$ and $S_3$ are closed together, a voltage level of $-V_1$ is added to inner DC source voltages, such as states 3 and 7. Similarly, when the switches $S_1$ and $S_4$ are closed together, a voltage level of $+V_1$ is added to the inner DC source voltages, such as states 6 and 10. Therefore, a threshold level can be employed to indicate the switching for the switches $S_1$~$S_4$. If the small reference voltage $V_{ref}$ is below the threshold level, the control signals g2 and g3 will be switched to logic "High" to close the switches $S_2$ and $S_3$. If the small reference voltage $V_{ref}$ is above the threshold level, the control signals g1 and g4 will be switched to logic "High" to close the switches $S_1$ and $S_4$.

In the controller 600 of FIG. 6, the control signals g3 and g4 are generated by using a comparator 613, a logic inverter 615, and two multiplying circuitries 614 and 616. The multiplying circuitries 614 and 616 are employed to ensure the control signals g3 and g4 are only switched when the control signal g5 is logic "Low", as shown in the states 3~10 of Table.1. When the control signal g5 is logic "Low", i.e., its reverse signal is logic "High", the output signals of the comparator 613 and the logic inverter 615 can be passed through the multiplying circuitries 614 and 616 to g4 and g3, respectively. Thus control signal g4 is determined by the comparison between the small reference voltage $V_{ref}$ and the carrier voltage Cr1. If the small reference voltage $V_{ref}$ is above the carrier voltage Cr1, the control signal g4 will be switched to logic "High" and hence the control signal g3 will be switched to logic "Low" through the inverter 615, vice versa. The simulated voltage waveforms of the control signal g3 and the control signal g4 are shown in FIGS. 7(d) and 7(e), respectively.

Unlike to the control signals g3 and g4, the control signals g1 and g2 can be switched when the control signal g5 is logic "High". Therefore, if the control signal g5 is logic "High", the carrier voltage Cr1 will be employed as the threshold voltage, but if the control signal g5 is logic "Low", the carrier Cr2 will be employed as the threshold voltage. This is achieved by using two comparators 617 and 618, a multiplying circuitry 619, a summing circuitry 620, and a logic inverter 621 in the controller 600 of FIG. 6. When the control signal g5 is logic "High", the output signal of the comparator 617 is logic "Low" since the small reference voltage $V_{ref}$ is above the carrier voltage Cr2, thus the output signal of the comparator 618 can be passed through the multiplying circuitry 619 and the summing circuitry 620 to the control signal g2 so that g2 is determined by the comparison between the small reference voltage $V_{ref}$ and the carrier voltage Cr1. If the small reference voltage $V_{ref}$ is above the carrier voltage Cr1, the control signal g2 will be switched to logic "Low" and hence the control signal g1 will be switched to logic "High" through the logic inverter 621, vice versa. When the control signal g5 is logic "Low", the output signal of the multiplying circuitry 619 is logic "Low", thus the output signal of the comparator 617 can be passed through the summing circuitry 620 to the control signal g2 so that g2 is determined by the comparison between the small reference voltage $V_{ref}$ and the carrier voltage Cr2. If the small reference voltage $V_{ref}$ is above the carrier voltage Cr2, the control signal g2 will be switched to logic "Low" and hence the control signal g1 will be switched to logic "High" through the logic inverter 621, vice versa. The simulated voltage waveforms of the control signal g1 and the control signal g2 are shown in FIGS. 7(b) and 7(c), respectively.

As shown in FIGS. 7(b)~7(e), the switching frequencies of the control signals g1~g4 are much higher than that of the output voltage, so switching devices with capability of limited blocking voltage may be preferred, such as IGBTs or MOSFETs.

Referring back to FIG. 4, two complementary control signals S1 and S3 control the switching operation of the H-bridge network 402. Specifically, the control signal S1 controls the switching operation of the switches $S_{L1}$ and $S_{L2}$ while the control signal S2 controls the switching operation of the switches $S_{L3}$ and $S_{L4}$. In the embodiment 600 of FIG. 6, the control signal S1 is provided by a comparator 622 comparing the sinusoidal signal $V_1 \sin(2\pi ft)$ output from the sinusoidal wave generator 601 with a threshold level corresponding to an output voltage level of 0V, i.e. middle point of the desired output voltage waveform; and the control signal S3 is provided by a logic inverter 623 inverting the logic level of the control signal S1. If the comparator 622 indicates the voltage level of the sinusoidal signal $V_1 \sin(2\pi ft)$ is above 0V, the control signal S1 will be logic "High" and the control signal S3 will be logic "Low" so that the controlled switching devices $S_{L1}$ and $S_{L2}$ are closed while the controlled switching devices $S_{L3}$ and $S_{L4}$ are open. The instantaneous voltage level of the output voltage $V_o$ will thus be above 0V, as shown in the first half cycle (0·π) of the output waveform in FIG. 7(i). If the comparator 622 indicates the voltage level of the sinusoidal signal is below 0V, the control signal S1 will be logic "Low" and the control signal S3 will be logic "High" so that the controlled switching devices $S_{L1}$ and $S_{L2}$ are open while the controlled switching devices $S_{L3}$ and $S_{L4}$ are closed. The instantaneous voltage level of the output voltage $V_o$ will thus be below 0V, as shown in the second half cycle (π~2π) of the output waveform in FIG. 7(i).

Figure 8:
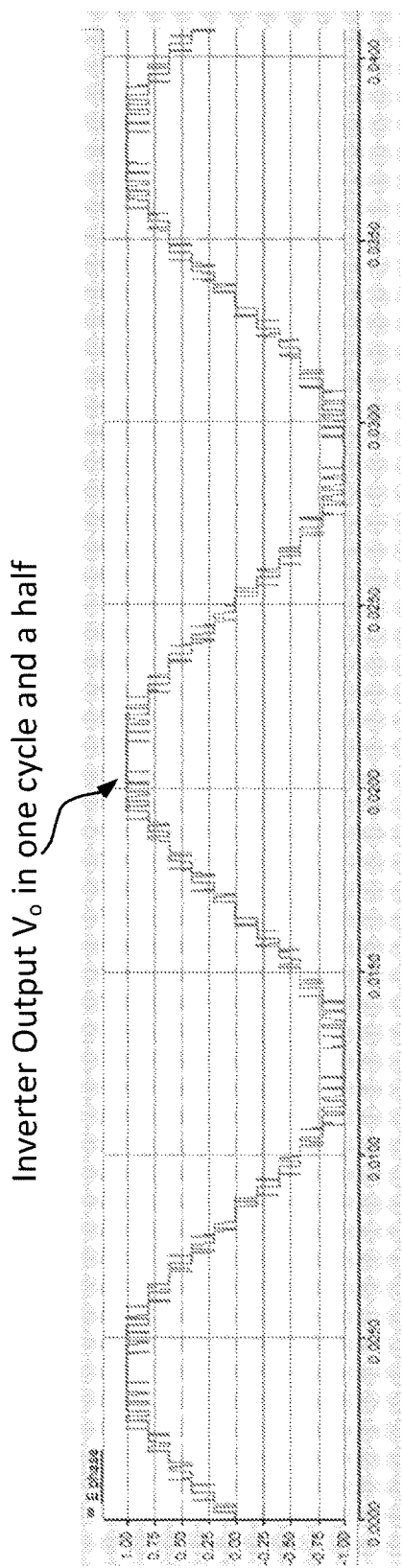
FIG. 8 is a time chart which shows the inverter output voltage of the exemplary multilevel inverter of FIG. 4 in one cycle and a half.
Figure 9:
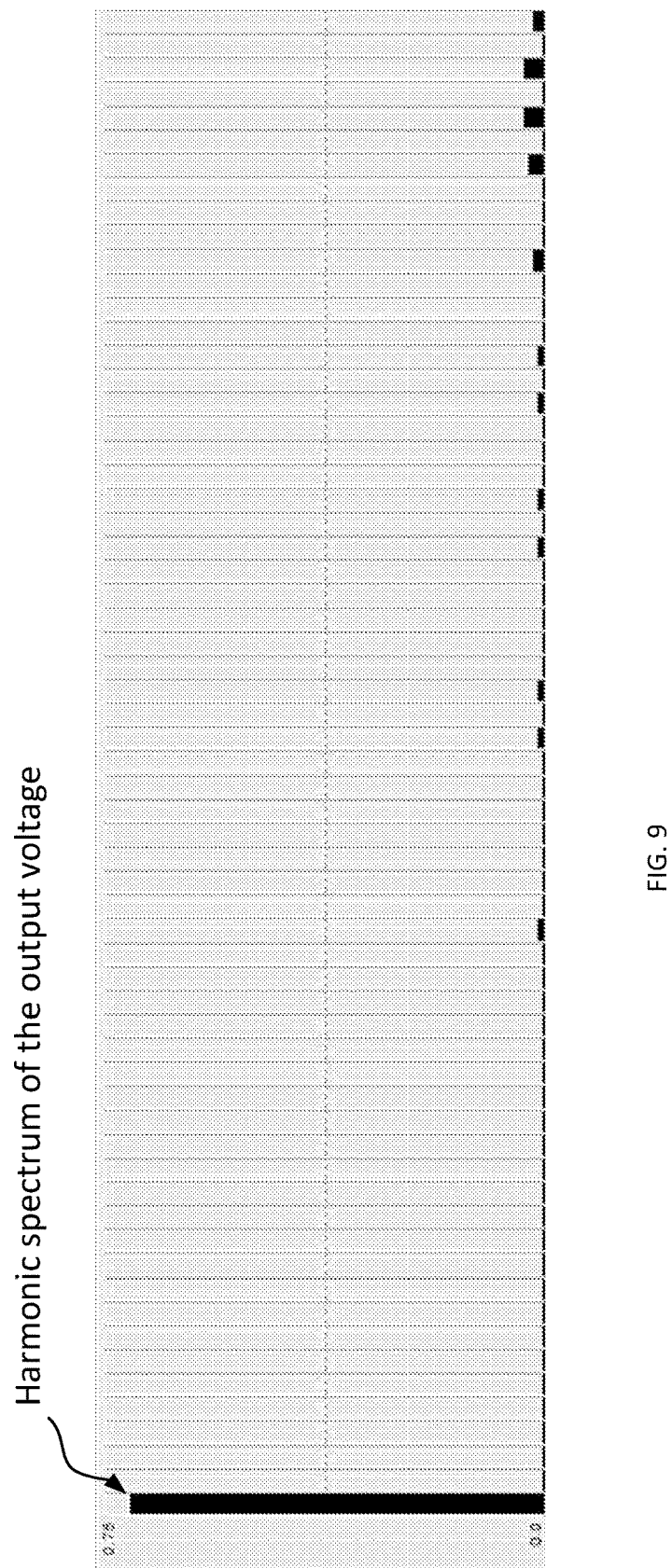
FIG. 9 is a harmonic spectrum of the output voltage of the exemplary multilevel inverter of FIG. 4.

The simulation waveform of the output voltage $V_o$ of the multilevel inverter 400 of FIG. 4 is illustrated in FIG. 7(i). In addition, FIG. 8 illustrates the output voltage $V_o$ in one cycle and a half and FIG. 9 illustrates the harmonic spectrum of the output voltage $V_o$ of the multilevel inverter 400 of FIG. 4. It can be seen that the Total Harmonic Distortion (THD) of the multilevel inverter 400 of FIG. 4 with proposed hybrid modulation scheme is low (6.8%) and thus a high quality sinusoidal output voltage waveform can be obtained using the present hybrid modulation scheme. The harmonic content can be even reduced with a proper filter at the output of the inverter. With the hybrid modulation scheme in the present disclosure, the effective spectral response of the output voltage depends on high frequency switching, and the total number of the voltage levels is determined by the number of DC source cells used in the inner DC group and the voltage rating of switching devices with high voltage blocking capability. Therefore, both high voltage and high quality AC output voltage waveform signal can be provided by employing a multilevel inverter in accordance with the present disclosure.

Although the controller 600 is illustrated and described to generate an 11-level voltage output at the inverter using a hybrid modulation scheme, the controller 600 may be used to generate a voltage waveform having more than eleven voltage levels. For this purposed, the controller 600 may be modified to employ more carrier waveforms and/or adjust the threshold levels of the comparators. In addition, the controller 600 is an exemplary generic controller in accordance with the present disclosure. Based on the illustration and description of the generic controller structure above, one skilled in the art is able to implement a controller for a hybrid modulation scheme in accordance with the present disclosure using analog or digital components, or a combination thereof, or any other suitable programmable device, such as a microprocessor, FPGA, ASIC, DSP, or the like.

While the circuit topologies, the control strategies, and the methods illustrated above apply to signal phase inverters, all of these can be adapted to three phase inverters without deviating from the scope of the present disclosure.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

What is claimed is:

1. A power conversion system comprising:
a multilevel inverter circuitry configured to
(a) arrange $N_{source}$ DC voltage sources in series between a positive terminal of a first one of the $N_{source}$ DC voltage source and a negative terminal of a last one of the $N_{source}$ DC voltage sources;
(b) connect at least $N_{source}-1$ controlled switching devices to the $N_{source}$ DC voltage sources to ensure at least one of the at least $N_{source}-1$ controlled switching devices is connected between any two adjacent DC voltage sources, to form an electrical path between the positive terminal of the first one of the $N_{source}$ DC voltage source and the negative terminal of the last one of the $N_{source}$ DC voltage source;
(c) connect at least another $N_{source}-1$ controlled switching devices to the $N_{source}$ DC voltage sources to ensure at least one controlled switching device is connected between the negative terminal of the last one of the $N_{source}$ DC voltage sources and the negative terminal of any one of the other $N_{source}-1$ DC voltage sources;
(d) provide at least another three controlled switching devices wherein at least one of at least another three controlled switching devices is connected between a positive terminal of the first one of the $N_{source}$ DC voltage source and a positive terminal of the second one of the $N_{source}$ DC voltage source, and at least two of the at least another three controlled switching devices are connected in series across the positive terminal and negative terminal of the first one of the $N_{source}$ DC voltage source; and
(e) connect an H-bridge circuit comprising at least four controlled switching devices between a negative terminal of the last DC voltage source and any common terminal of the controlled switching devices connected in series across the positive terminal and the negative terminal of the first of the at least $N_{source}-1$ DC voltage source, to drive a current in both positive and negative directions to a load,
wherein a voltage levels provided by the others $N_{source}-1$ DC voltage sources is twice a voltage level provided by the first one of the $N_{source}$ DC voltage sources, and wherein a total number of a voltage levels $N_{step}$ provided by the $N_{source}$ DC voltage sources is determined according to $N_{step}=4N_{source}-1$.

2. The power conversion system of claim 1, wherein a maximum output voltage level $V_{o,max}$ provided by the $N_{source}$ DC voltage sources is $2N_{source}-1$ times the voltage level provided by the first one of the $N_{source}$ DC voltage sources.

3. The power conversion system of claim 1, wherein a number of the at least $N_{source}-1$ DC voltage sources $N_{source} \geq 3$ and a total number of the controller switching devices $N_{switch}$ is determined according to $N_{switch} \geq 2N_{source}+5$.

4. The power conversion system of claim 1, wherein a total blocking voltage $V_{block,n}$ is determined according to $$V_{block,n} = 2\left(n^2 + 6n + 4 - \sum_{k=1}^{n} k\right) V_{dc}, \text{ wherein } n = N_{source} - 1.$$

5. The power conversion system of claim 1, further comprising a controller to operate the at least $N_{source}-1$ controlled switching devices.

6. The power conversion system of claim 1, wherein the hybrid modulation scheme employs a sinusoidal pulse width modulation technique (SPWM).

7. The power conversion system of claim 6, wherein the sinusoidal pulse width modulation compares a reference voltage $V_{ref}$ with two carriers.

8. The power conversion system of claim 7, wherein the reference voltage $V_{ref}$ is determined according to $$V_{ref} = |V_1 \sin(2\pi f t)| - V_{core}\left[\sum_{i=1,3,5,...}^{\frac{T_{core}}{2}-1} [u(t-t_i) + u(t-t_{i+T_{core}})] - \sum_{i=0,2,4,...}^{\frac{T_{core}}{2}-2} [u(t-t_{T_{core}-i}) + u(t-t_{2T_{core}-i})]\right],$$

$V_1 \sin(2\pi ft)$ is a desired output voltage, $V_1$ is an amplitude of the desired output voltage, f is a frequency of the desired output voltage, $$V_{core} = \frac{V_1}{N_{core}+0.5}, N_{core} = N_{source}-1, T_{core} = 4N_{core}.$$

9. The power conversion system of claim 7, wherein a amplitude ratio between the reference voltage and a carrier voltage $$m = \frac{V_{ref}(\text{peak})}{Cr_{1,2}(\text{peak})}$$

is determined according to $0 \leq m \leq 1$.

10. The power conversion system of claim 1, wherein the at least one of the $N_{source}-1$ controlled switches connected between the positive terminal of the first DC voltage source and the positive terminal of the second DC voltage source and the at least one of the $N_{source}-1$ controlled switches between the negative terminal of the first DC voltage source and an input terminal of the H-bridge circuit are bidirectional switches.

11. A method for providing a multilevel power inverter, the method comprising:
(a) arranging, via a processing circuitry, $N_{source}$ DC voltage sources in series between a positive terminal of a first one of the $N_{source}$ DC voltage source and a negative terminal of a last one of the $N_{source}$ DC voltage sources;
(b) connecting, via a processing circuitry, at least $N_{source}-1$ controlled switching devices to the $N_{source}$ DC voltage sources to ensure at least one of the at least $N_{source}-1$ controlled switching devices is connected between any two adjacent DC voltage sources, to form an electrical path between the positive terminal of the first one of the $N_{source}$ DC voltage source and the negative terminal of the last one of the $N_{source}$ DC voltage source;
(c) connecting, via a processing circuitry, at least another $N_{source}-1$ controlled switching devices to the $N_{source}$ DC voltage sources to ensure at least one controlled switching device is connected between the negative terminal of the last one of the $N_{source}$ DC voltage sources and the negative terminal of any one of the other $N_{source}-1$ DC voltage sources;
(d) providing, via a processing circuitry, at least another three controlled switching devices wherein at least one of the at least another three controlled switching devices connected between the positive terminal of the first DC voltage source and between a positive terminal of the second DC voltage source, and at least two of the at least another three controlled switching device is connected in series across the positive terminal and a negative terminal of the first one of the $N_{source}-1$ DC voltage source; and
(e) connecting, via a processing circuitry, an H-bridge circuit comprising at least four controlled switching devices between a negative terminal of the last DC voltage source and any common terminal of the controlled switching devices connected in series across the positive terminal and the negative terminal of the first of the at least $N_{source}-1$ DC voltage source, to drive a current in both positive and negative directions to a load,
wherein the voltage levels provided by the others $N_{source}-1$ DC voltage sources is twice a voltage level provided by the first one of the $N_{source}$ DC voltage sources, and
wherein a total number of a voltage level $N_{step}$ provided by the $N_{source}$ DC voltage sources is determined according to $N_{step}=4N_{source}-1$.

12. The method of claim 11, wherein a maximum output voltage level $V_{o,max}$ provided by the $N_{source}$ DC voltage sources is $2N_{source}-1$ times the voltage level provided by the first one of the $N_{source}$ DC voltage sources.

13. The method of claim 11, wherein a number of the $N_{source}-1$ DC voltage sources $N_{source} \geq 3$ and a total number of the controller switching devices $N_{switch}$ is determined according to $N_{switch} \geq 2N_{source}+5$.

14. The method of claim 11, wherein a total blocking voltage $V_{block,n}$ is determined according to $$V_{block,n} = 2\left(n^2 + 6n + 4 - \sum_{k=1}^{n} k\right) V_{dc},$$

wherein $n=N_{source}-1$.

* * * * *